United States Patent
Orman

(10) Patent No.: US 10,455,004 B2
(45) Date of Patent: Oct. 22, 2019

(54) CONTROLLING AN APPLICATION DEPENDENCY IDENTIFIER

(71) Applicant: Microsoft Technology Licensing, LLC, Redmond, WA (US)

(72) Inventor: Jerry K. Orman, Goodyear, AZ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 430 days.

(21) Appl. No.: 15/340,722

(22) Filed: Nov. 1, 2016

(65) Prior Publication Data

US 2018/0124182 A1 May 3, 2018

(51) Int. Cl.
*H04L 29/08* (2006.01)
*H04L 29/06* (2006.01)

(52) U.S. Cl.
CPC .......... *H04L 67/10* (2013.01); *H04L 63/0227* (2013.01); *H04L 63/10* (2013.01); *H04L 67/04* (2013.01)

(58) Field of Classification Search
CPC ..... H04L 67/10; H04L 67/04; H04L 63/0227; H04L 63/10
USPC ........................................................ 709/208
See application file for complete search history.

(56) References Cited

U.S. PATENT DOCUMENTS

| 8,612,577 B2 | 12/2013 | Ferris et al. |
| 9,367,257 B2 | 6/2016 | Hamilton et al. |
| 2013/0091285 A1 | 4/2013 | Devarakonda et al. |
| 2014/0359129 A1 | 12/2014 | Sharma et al. |
| 2016/0380916 A1* | 12/2016 | Gnaneswaran ....... H04L 47/803 709/224 |

OTHER PUBLICATIONS

Jermyn, et al., "Improving readiness for enterprise migration to the cloud", In Proceedings of Middleware Industry Track, Dec. 8, 2014, 7 pages.

Frey, et al., "The CloudMIG Approach: Model-Based Migration of Software Systems to Cloud-Optimized Applications", In International Journal on Advances in Software, vol. 4, No. 3-4, Jan. 2011, pp. 342-353.

Vasconcelos, et al., "Cloud Detours: A Non-intrusive Approach for Automatic Software Adaptation to the Cloud", In Proceedings of Fourth European Conference on Service-Oriented and Cloud Computing, Sep. 15, 2015, pp. 1-15.

Li, et al., "CloudProphet: Predicting Web Application Performance in the Cloud", In Proceedings of ACM SIGCOMM Conference, Aug. 15, 2011, pp. 1-16.

Gui, et al., "A Service Brokering and Recommendation Mechanism for Better Selecting Cloud Services", In Journal of Plos One, vol. 9, Issue 8, Aug. 29, 2014, 15 pages.

(Continued)

*Primary Examiner* — Tu T Nguyen
(74) *Attorney, Agent, or Firm* — Christopher J. Volkmann; Kelly, Holt & Christenson, PLLC

(57) ABSTRACT

An application identifier control system controls an application dependency identification system to access request logs in one or more front end server systems that are providing access to a hosted application and identify dependencies. The dependencies are identified by identifying successful data access requests to an endpoint to be migrated, that originate from a separate, requesting application. A surfacing control system controls surfacing logic to surface the dependencies.

14 Claims, 10 Drawing Sheets

(56) References Cited

OTHER PUBLICATIONS

Smit, et al., "Partitioning Applications for Hybrid and Federated Clouds", In Proceedings of Conference of the Center for Advanced Studies on Collaborative Research, Nov. 5, 2012, 15 pages.
Krein, Jakob, "Framework for Application Topology Discovery to enable Migration of Business Processes to the Cloud", In Thesis of University of Stuttgart, Apr. 26, 2012, pp. 1-95.
Hwang, et al., "Cloud Transformation Analytics Services: A Case Study of Cloud Fitness Validation for Server Migration", In Proceedings of IEEE International Conference on Services Computing, Jun. 27, 2015, pp. 387-394.
Saujanya, et al., "Performance Antipatterns: Detection and Evaluation of Their Effects in the Cloud", In Proceedings of IEEE International Conference on Services Computing, Jul. 2, 2014, pp. 758-765.
Stefanov, et al., "Iris: A Scalable Cloud File System with Efficient Integrity Checks", In Proceedings of 28th Annual Computer Security Applications Conference, Dec. 3, 2012, 10 pages.
Bergmayr, et al., "Migrating Legacy Software to the Cloud with ARTIST", In Proceedings of 17th European Conference on Software Maintenance and Reengineering, Mar. 2013, 5 pages.
Bai, et al,, "What to Discover Before Migrating to the Cloud", In Proceedings of IFIP/IEEE International Symposium on Integrated Network Management, May 31, 2013, pp. 320-327.
Yadav, et al., "Legacy Applications Migration Process to Cloud—an approach Framework", In International Journal of Computer Technology and Electronics Engineering, vol. 4, Issue 2, Apr. 2014, pp. 11-14.

\* cited by examiner

US 10,455,004 B2

CONTROLLING AN APPLICATION DEPENDENCY IDENTIFIER

BACKGROUND

Computing systems are currently in wide use. Some such computing systems host applications that are accessible by separate computing systems or applications.

For instance, some computing systems host applications and provide access to the hosted applications through a front end computing system. Separate applications can make data access requests to the hosted application, through the front end computing system.

It is not uncommon for persons maintaining the hosted application to migrate portions, or all, of the hosted application to a different location. By way of example, it may be that the hosted application is hosted in an on-premise computing system. However, it may be that portions or all of the hosted application are to be migrated to a cloud-based server environment.

When this happens, the separate, requesting applications, that are separate from the hosted environment hosting the application, may continue to make data access requests to the particular endpoint of the hosted application, at its old location (at the location before it was migrated). These separate, requesting applications are often client side applications that are using data generated or maintained by the hosted application. Therefore, when they make a data access request to an endpoint at its old location, this can cause the client side application to malfunction. Not only does this inhibit the client side application from working properly, but it can also be strongly detrimental to the user experience of a user who is using the client side application.

The discussion above is merely provided for general background information and is not intended to be used as an aid in determining the scope of the claimed subject matter.

SUMMARY

An application identifier control system controls an application dependency identification system to access request logs in one or more front end server systems that are providing access to a hosted application and identify dependencies. The dependencies are identified by identifying successful data access requests to an endpoint to be migrated, that originate from a separate, requesting application. A surfacing control system controls surfacing logic to surface the dependencies.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
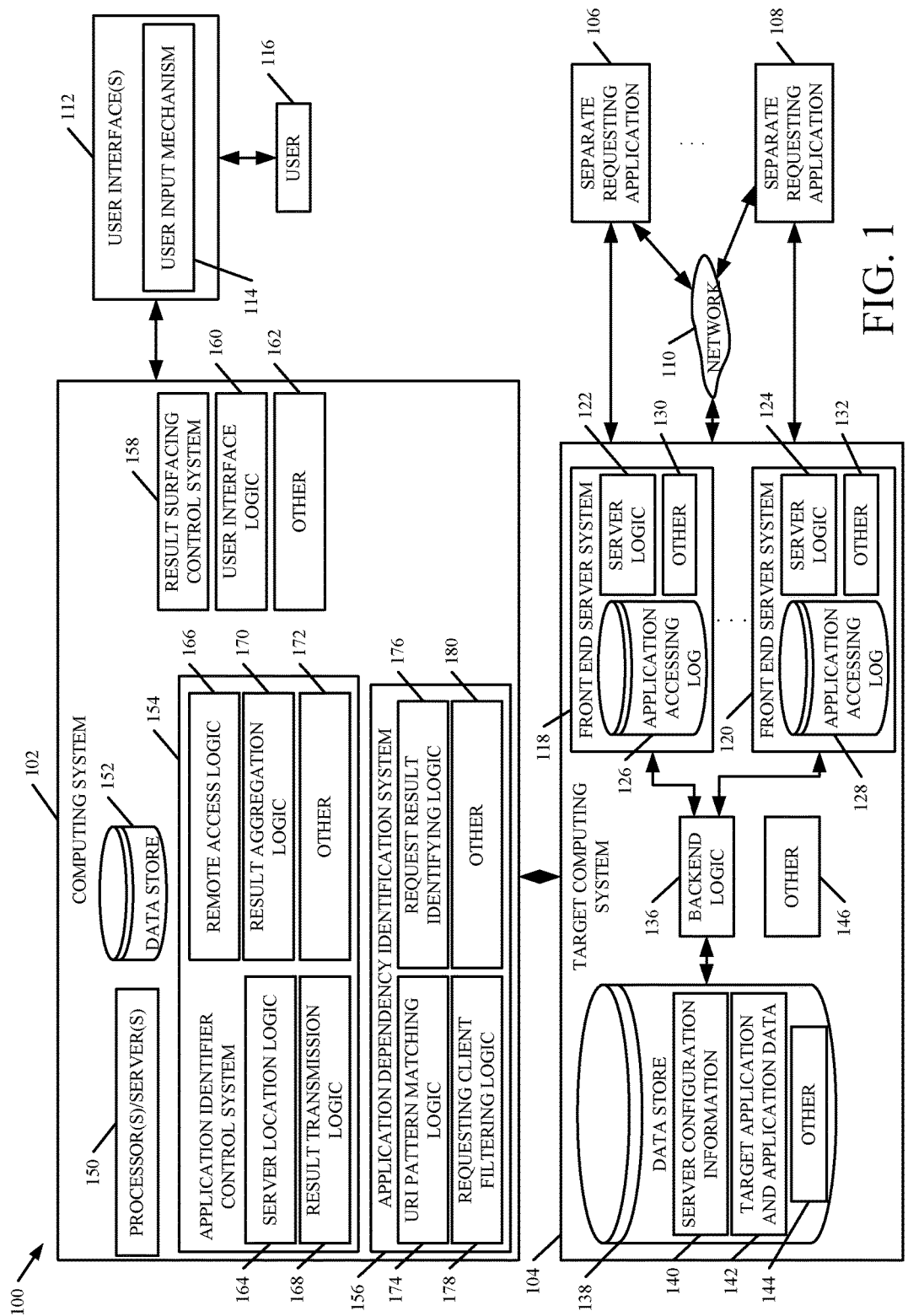
FIG. 1 is a block diagram of one example of a computing system architecture.

FIG. 1 is a block diagram of one example of a computing system architecture 100. Architecture 100 illustratively includes computing system 102, target computing system 104, one or more separate, requesting applications 106-108 that have access to target computing system 104 either directly, or over network 110. FIG. 1 also shows that, in one example, computing system 102 can generate user interfaces 112 with user input mechanisms 114 for interaction by user 116. User 116 can be an administrative user who may be assisting in the migration of part or all of target computing system 104 to a new location. User 116 can illustratively interact with user input mechanisms 114 in order to control and manipulate computing system 102.

In the example shown in FIG. 1, the separate, requesting applications 106 and 108 can illustratively make data access requests for data in target computing system 102. Therefore, when target computing system 102 is being migrated (in whole or in part) to a different server environment (e.g., from an on-premise system to a cloud-based system or otherwise), then the separate, requesting applications 106-108 may still continue to make data access requests to the endpoint in target computing system 104 at its old location (e.g., to the location prior to its migration). This can cause the separate, requesting applications 106-108 to malfunction.

Therefore, in accordance with one example, computing system 102 automatically identifies dependencies of separate, requesting applications 106-108 to determine whether they are dependent on a portion of the application hosted by target computing system 104 that is going to be moved. If so, it illustratively surfaces the application dependencies it has identified for user 116, or for other users, so that the dependencies can be addressed before the application hosted by target computing system 104 is migrated. Before describing the overall operation of architecture 100 in more detail, a brief description of some of the items in architecture 100, and their operation, will first be provided.

Target computing system 104 illustratively includes one or more front end server systems 118-120. Each front end server system 118-120 illustratively includes server logic 122-124, an application accessing log 126-128, and they can include a wide variety of other items 130-132. Target computing system 104 also illustratively includes back end logic 136 and data store 138, which can store server configuration information 140, a target application and application data 142, and other information 144. Target computing system 104, itself, can include a wide variety of other items 146 as well.

In operation, separate, requesting applications 106-108 make data access requests through one or more of the front end server systems 118-120. For purposes of the present example, it will be assumed that separate, requesting application 106 is making a data access request through front end server system 118. Server logic 122 handles the interaction with the separate, requesting application 106 when it makes a data access request. Server logic 122 then stores request data identifying the request in application accessing log 126. Server logic 122 then interacts with back end logic 136 which, itself, accesses the target application and application data 142 based upon the data access request that was received from separate, requesting application 136. The data access request may take a wide variety of different forms, such as a read request, a delete or modify request, a data record create request, it can be an update request, or a variety of other requests.

Back end logic 136 may manipulate the application or data 142 based on the request. It can also return results through server logic 122 of front end server system 118, to separate, requesting application 106.

Computing system 102 can include one or more processors or servers 150, data store 152, application identifier control system 154, application dependency identification system 156, result surfacing control system 158, user interface logic 160, and it can include other items 162. Application identifier control system 154, itself, can include server location logic 164, remote access logic 166, result transmission logic 168, result aggregation logic 170, and it can include other items 172. Application dependency identification system 156, itself, can include URI pattern matching logic 174, request result identifying logic 176, requesting client filtering logic 178, and it can include other items 180.

Server location logic 164 identifies a server or server farm corresponding to each of the front end server systems 118-120 that are used to host the target application and application data 142 on target computing system 104. Remote access logic 166 obtains remote access to the application accessing logs 126-128 on the identified front end server systems 118-120. It also controls application dependency identification system 156 to identify application dependencies of the separate, requesting applications 106-108, by remotely parsing each of the application accessing logs 126-128. Result transmission logic 168 obtains the results of that parsing from each front end server system 118-120, and result aggregation logic 170 aggregates those separate results into a single result set that identifies the application dependencies on the target application and application data 142 hosted in target computing system 104. Result surfacing control system 158 illustratively generates control signals to control user interface logic 160 to surface the dependencies identified.

In order to parse the application accessing logs 126-128, application dependency identification system 156 illustratively controls URI pattern matching logic 174 to filter the application accessing log 126 to identify log entries where a data access request was made to a particular endpoint in target computing system 104 that is to be moved. Request result identifying logic 176 filters the log data to identify those data access requests which were successful, and requesting client filtering logic 178 filters the log data to identify requests that are coming from separate, requesting applications 106-108, as opposed to applications that may be local to the server environment in target computing system 104. Based upon the control of the various filtering and matching logic in application dependency identification system 156, application dependencies are identified for the separate, requesting applications 106-108 in each front end server system 118-120. Then, as briefly described above, application identifier control system 154 controls its logic to obtain those results, aggregate them and combine them into a single dependency result set.

Figure 2:
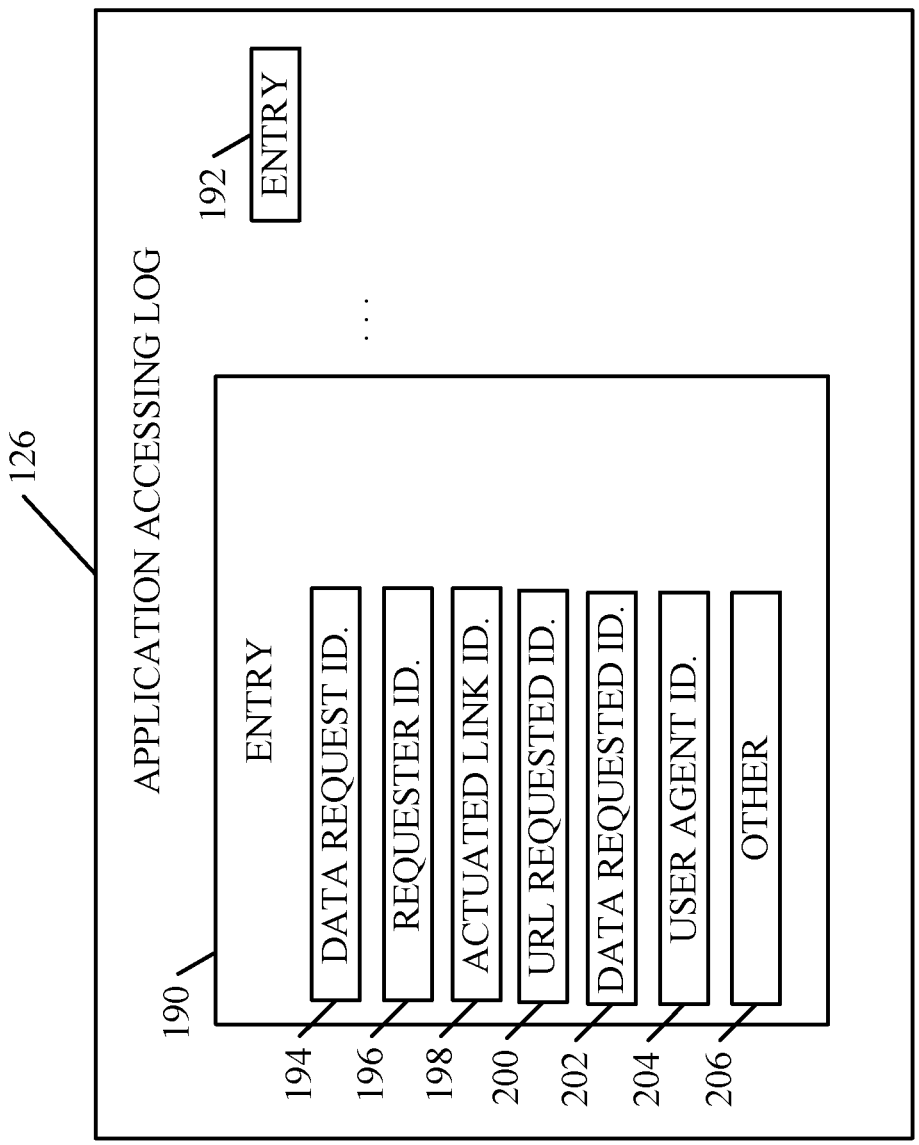
FIG. 2 is a block diagram of one example of an application accessing log.

FIG. 2 shows one example of information that can be stored in an application accessing log (for purposes of the present discussion, it will be assumed that the log is application accessing log 126). FIG. 2 shows that log 126 illustratively includes a plurality of entries 190-192. The entries may be similar or different. For the purposes of the present description, it will be assumed that they are similar so that only entry 190 will be described in more detail. Suffice it to say that each entry 190-192 represents a data access request from an application, including requests from separate, requesting applications 106-108.

Entry 190 illustratively includes a data access request identifier 194 that identifies the particular data access request corresponding to entry 190. Requestor identifier 196 identifies the particular requestor (e.g., the separate, requesting application 106 that made the request). Actuated link identifier 198 identifies a link that was actuated to make the request. For instance, the hosted application 142 may expose links that can be actuated in order to make a data access request. URL requested identifier 200 identifies the particular end point (or URL) from which data was requested. The data requested identifier 202 identifies the particular data record or set of records that were requested, and user agent identifier 204 identifies any user agent, such as whether the request came from a browser or the particular type of application the request came from, etc. Entry 190 can include a wide variety of other information 206 as well.

Figure 3:
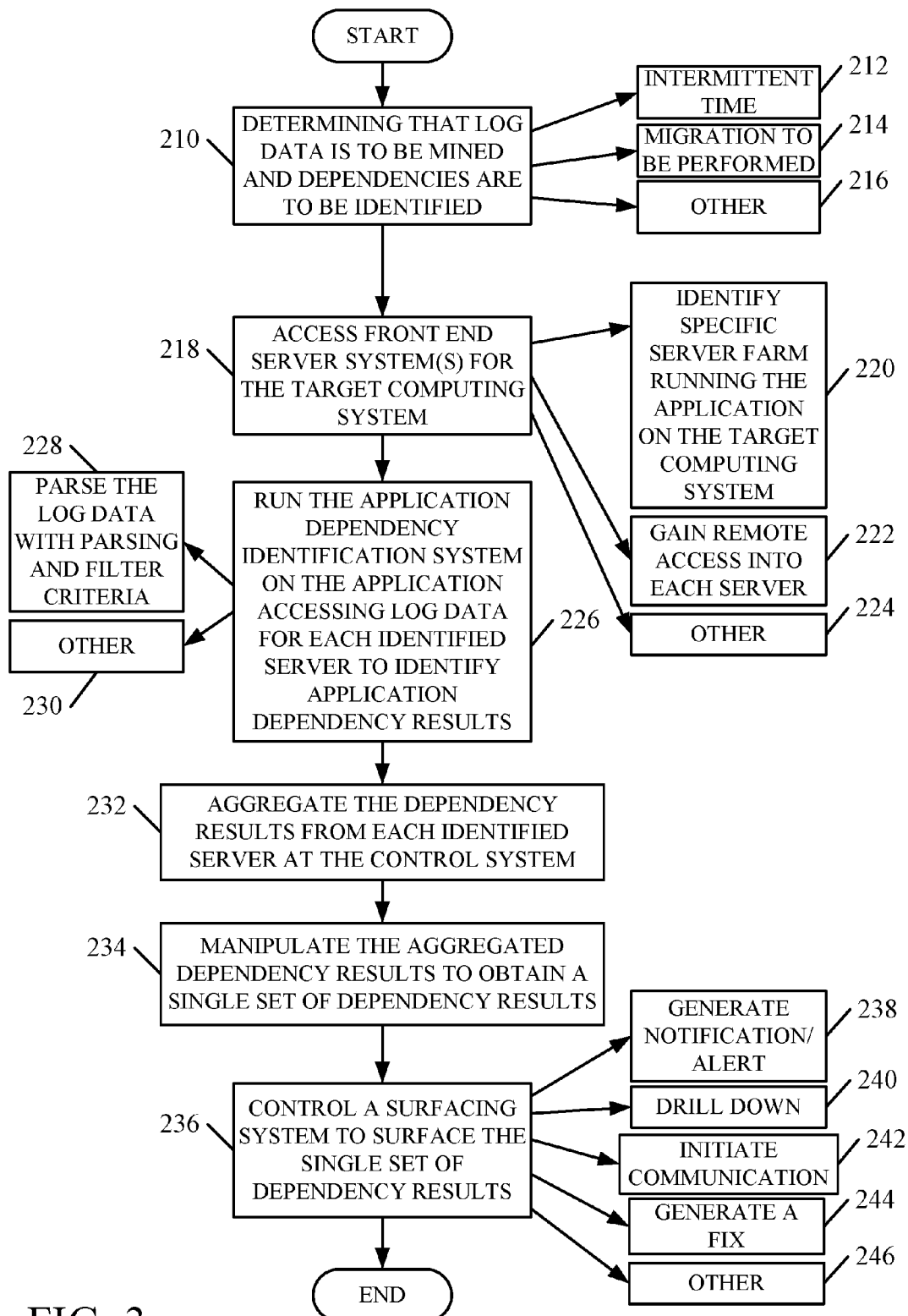
FIG. 3 is a flow diagram illustrating one example of the operation of an application identifier control system.

FIG. 3 is a flow diagram illustrating one example of the operation of application identifier control system 154 in obtaining access to application accessing log 126, and running application dependency identification system 156 remotely to parse log 126 to identify application dependencies. Application identifier control system 154 first determines that the log data is to be mined and dependencies are to be identified. This is indicated by block 210 in the flow diagram of FIG. 3. This can be done intermittently, or periodically, as indicated by block 212. It may be prompted based on other criteria as well, such as by receiving an indication that one or more endpoints in target computing system 104 are to be moved or migrated to a different location. This is indicated by block 214. It can be determined in other ways as well, and this is indicated by block 216.

Server location logic 164 then identifies the particular front end server systems 118-120 that service the endpoint that is to be migrated, and gains remote access (or at least partial remote control) of the identified front end server systems 118-120. Accessing the front end server systems for the target computing system is indicated by block 218. Identifying the specific server farm running the application on the target computing system and gaining remote access to each server is indicated by blocks 220 and 222 in the flow diagram of FIG. 3. The access can be gained in other ways as well, and this is indicated by block 224.

Remote access logic 166 then runs the application dependency identification system 156 on the application accessing log data for each identified server to identify application dependency results that indicate which separate, requesting applications 106-108 are dependent on the particular end point in target computing system 104 that is to be moved or migrated. This is indicated by block 226 in the flow diagram of FIG. 3. In doing so, it can use the various logic in system 156 to parse the log data with various parsing and filter criteria in order to identify the application dependencies. This is indicated by block 228. It can run the application dependency identification system 156 in other ways as well, and this is indicated by block 230. One example of how the data is parsed by application dependency identification system 156 is described in greater detail below with respect to FIGS. 4 and 5.

Result aggregation logic 170 then aggregates the dependency results from each identified server, at application identifier control system 154. This is indicated by block 232 in the flow diagram of FIG. 3. In doing so, it illustratively combines the results into a single set of results, by eliminating duplicate dependencies or other duplicate results generated during the parsing process. Manipulating the aggregated dependency results to obtain the single set of dependency results is indicated by block 234.

Result surfacing control system 158 then generates control signals to control use interface logic 160 to surface the single set of dependency results for user 116, or for another system. This is indicated by block 236. In doing so, it may surface the results with user actuatable elements that allow the user to perform actions on those results, such as to automatically generate notifications or alerts, to automatically drill into the dependency information to see more detail, to initiate communications, to automatically generate a fix to fix the dependency so that it will be dependent on the new location of the endpoint from which it is requesting data, or a wide variety of other information. This is indicated by blocks 238, 240, 242, 244, and 246, respectively.

Figure 4:
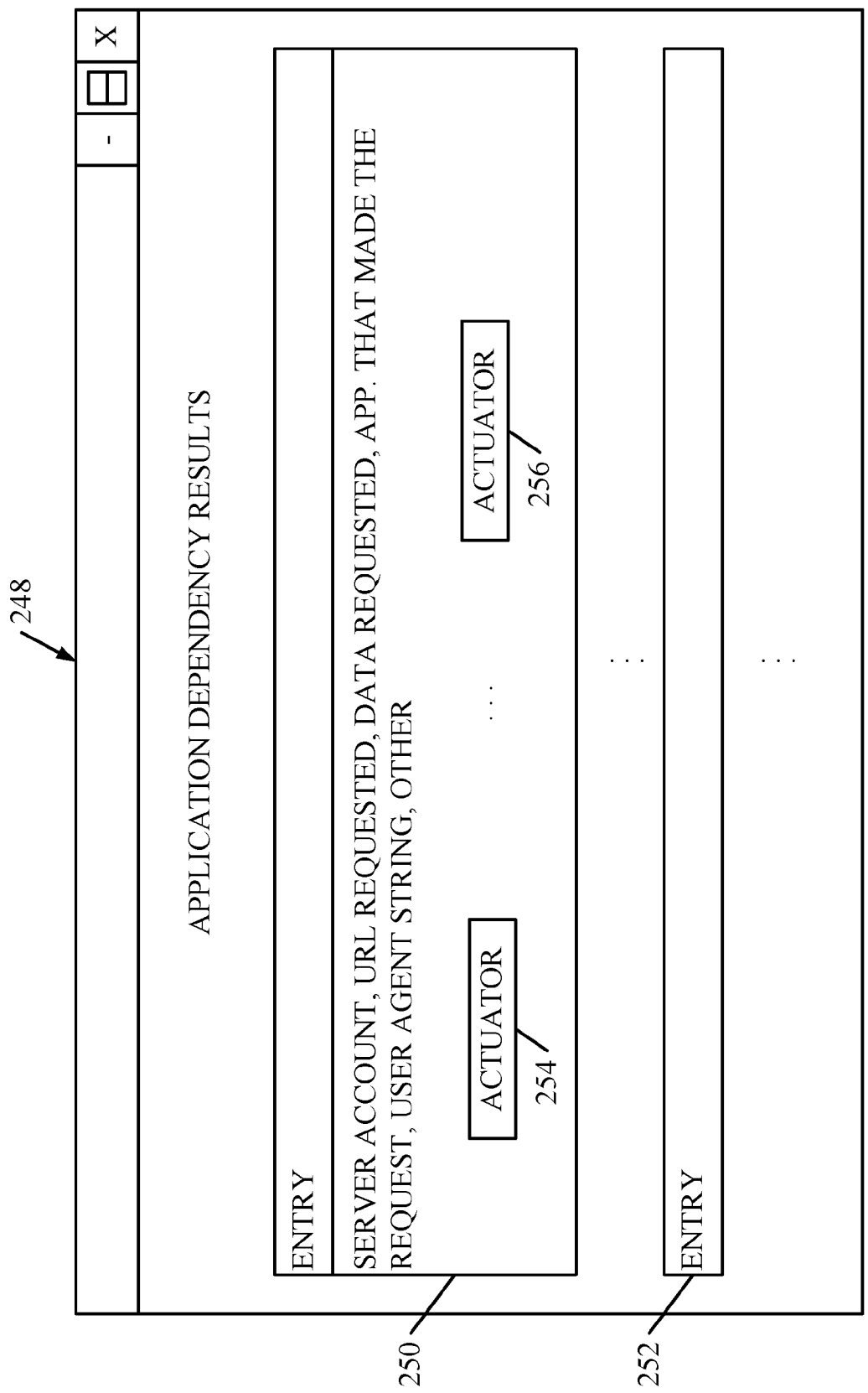
FIG. 4 is a block diagram of one example of application dependency results.

FIG. 4 shows one example of a user interface display 248 that can be generated to surface the dependency results. In one example, user interface display 248 illustratively includes a plurality of different entries 250-252, each of which displays a dependency result. In one example, each entry 250-252 is a comma delimited display that displays information identifying the application dependency on the endpoint that is to be moved. For instance, each entry can identify the server account through which the data access request was made, the particular URL endpoint from which data was requested, the particular data records or data entities that were requested, an identifier identifying the separate, requesting application that made the request, the user agent string, and it can include other information. In addition, each entry may include one or more user actuatable actuators 254-256 that can be actuated by the user in order to perform the actions, such as those illustrated by blocks 238-246 in FIG. 3, above. It will be noted that FIG. 4 is only one example and a wide variety of other user interface displays or other mechanisms for generating or surfacing the application dependency results can be used as well.

Figure 5:
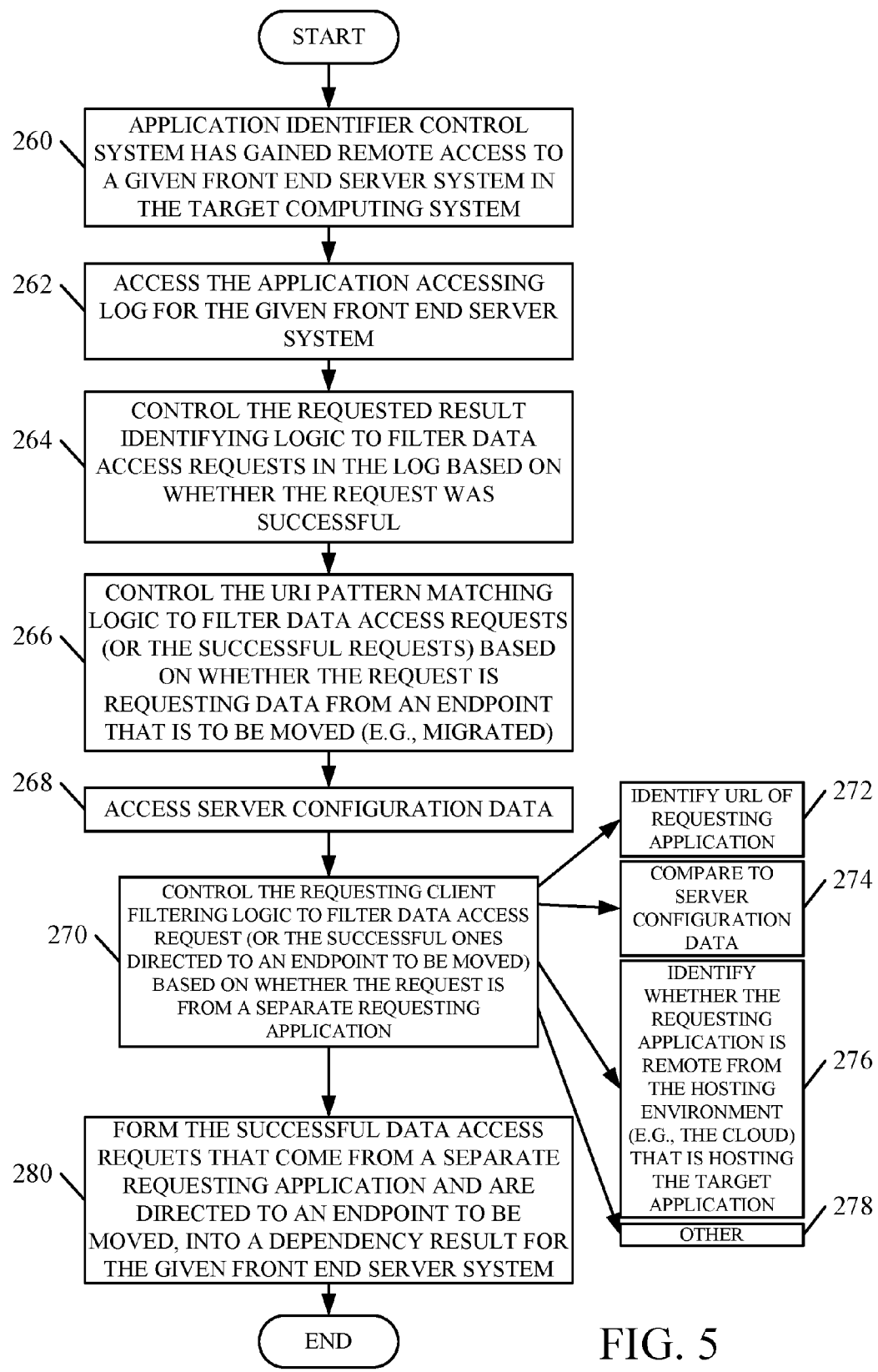
FIG. 5 is a flow diagram illustrating one example of the operation of an application dependency identification system.

FIG. 5 is a flow diagram illustrating one example of the operation of application dependency identification system 156 in parsing application accessing log 126 based on parsing and filter criteria, in order to identify the application dependencies. It will be noted that, in one example, the operations shown in FIG. 5 can be performed remotely, in each front end server system 118 by a processor or server in those systems, and by accessing the information in the application accessing log 126, through the remote control processing.

It is assumed that the remote access logic 166 in application identifier control system 184 has already gained remote access to a given front end server system (e.g., front end server system 118) in the target computing system 104. This is indicated by block 260 in the flow diagram of FIG. 5. Application dependency identification system 156 then accesses the application accessing log 126 for the given front end server system 118. This is indicated by block 262. In one example, application accessing log 126 may be in a database that exposes a front end search system that allows application dependency identification system 156, when it is run remotely within front end server system 118, to access the data in application accessing log 126. Obtaining access can be performed in other ways as well.

System 156 first controls the request result identifying logic 176 to filter the data access requests in log 126 based on whether the request was successful. This is indicated by block 264. In this filtering and parsing step, criteria are enforced to identify only those data access requests in application accessing log 126 that were successful, and to filter out the remaining requests.

System 156 then controls the URI pattern matching logic 174 to filter data access requests (or just the successful requests identified in block 264) based on whether the request is requesting data from and end point in target computing system 104 that is to be moved or migrated. This is indicated by block 266. For instance, if the target computing system is to be a hybrid computing system where some of the endpoints are to be moved (e.g., to a cloud environment) but some are to be maintained in their present location, then it may be that some of the data access requests logged in application accessing log 126 are to endpoints that will not be moved. In that case, those data access requests can be parsed (or identified) and filtered out of the data that will be used in determining the application dependencies.

Requesting client filtering logic 178 then accesses server configuration information 140 in data store 138. This is indicated by block 268 in the flow diagram of FIG. 5. The server configuration data illustratively identifies native applications that are native to target computing system 104 that may be requesting data from the front end server systems as well. Where they are native applications, then even if an endpoint is moved, the native applications will automatically be modified so that they request data from the new location. Thus, only the data application requests in application accessing log 126 that come from separate, requesting applications 106-108 need be identified. System 156 thus controls the requesting client filtering logic 178 to filter data access requests in log 126 (or the subset of those requests that have previously been identified as successful requests that are directed to an endpoint that is to be moved) based upon whether the request is from a separate, requesting application, or whether it is from a native application in target computing system 104. This is indicated by block 270 in the flow diagram of FIG. 5. In doing so, requesting client filtering logic 178 can identify a URL corresponding to the requesting application. This is indicated by block 272. It can then compare that URL to the server configuration information 140, as indicated by block 274. It can identify whether the requesting application is remote from the hosting environment of target computing system 104 (e.g., whether it is remote from the cloud in which target computing system 104 is deployed, or otherwise). This is indicated by block 276. It can filter the data access requests based on whether they come from a separate, requesting application in other ways as well, and this is indicated by block 278.

Once the filter and parsing criteria described above with respect to blocks 264, 266, and 270 have been applied, then the remaining data access requests which are mined from application accessing log 126 will be data access requests that are successful, that are directed to the particular endpoint in target computing system 104 that is to be moved, and that come from a separate, requesting application as opposed to a native application. Result transmission logic 166 in application identifier control system 154 then forms those results into a dependency result for the given front end server system 118. This is indicated by block 280 in the flow diagram of FIG. 5. Then, as described above with respect to FIG. 3, the dependency results for each front end server system 118-120 are aggregated by result aggregation logic 170 and combined into a single result set that can be surfaced and acted on by user 116.

It can thus be seen that system 102 applies a particular set of filtering and parsing criteria to each application accessing log 126-128 in a target computing system 104 to identify application dependencies of separate, requesting applications 106-108. These dependencies can be surfaced and used to correct the separate, requesting applications 106-108, even before the endpoint is migrated or moved, so that applications 106-108 will not malfunction. This increases the accuracy and functioning capability of each of those applications, and it increases the performance of the overall target computing system, because the requesting applications will not break after migration. It also enhances the user experience in that the separate, requesting applications, which are servicing various users, will not suffer any performance degradation or will not break, even after a migration of an endpoint from which data is requested.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
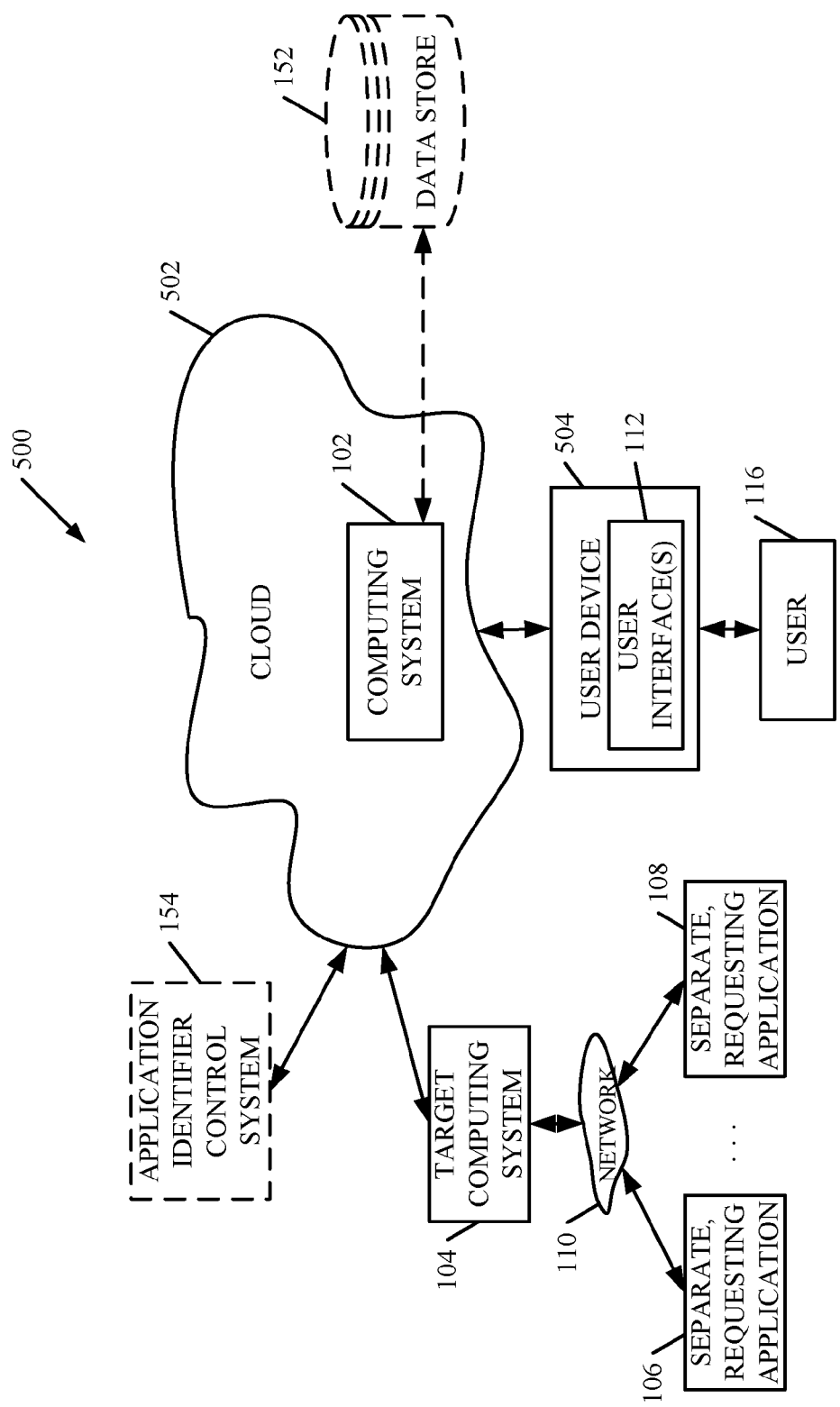
FIG. 6 is a block diagram showing the architecture illustrated in FIG. 1, deployed in a cloud computing architecture.

FIG. 6 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 6, some items are similar to those shown in FIG. 1 and they are similarly numbered. FIG. 6 specifically shows that computing system 100 can be located in cloud 502 (which can be public, private, or a combination where portions are public while others are private). Therefore, user 116 uses a user device 504 to access those systems through cloud 502.

FIG. 6 also depicts another example of a cloud architecture. FIG. 6 shows that it is also contemplated that some elements of computing system 104 can be disposed in cloud 502 while others are not. By way of example, data store 152 can be disposed outside of cloud 502, and accessed through cloud 502. In another example, application identifier control system 154 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
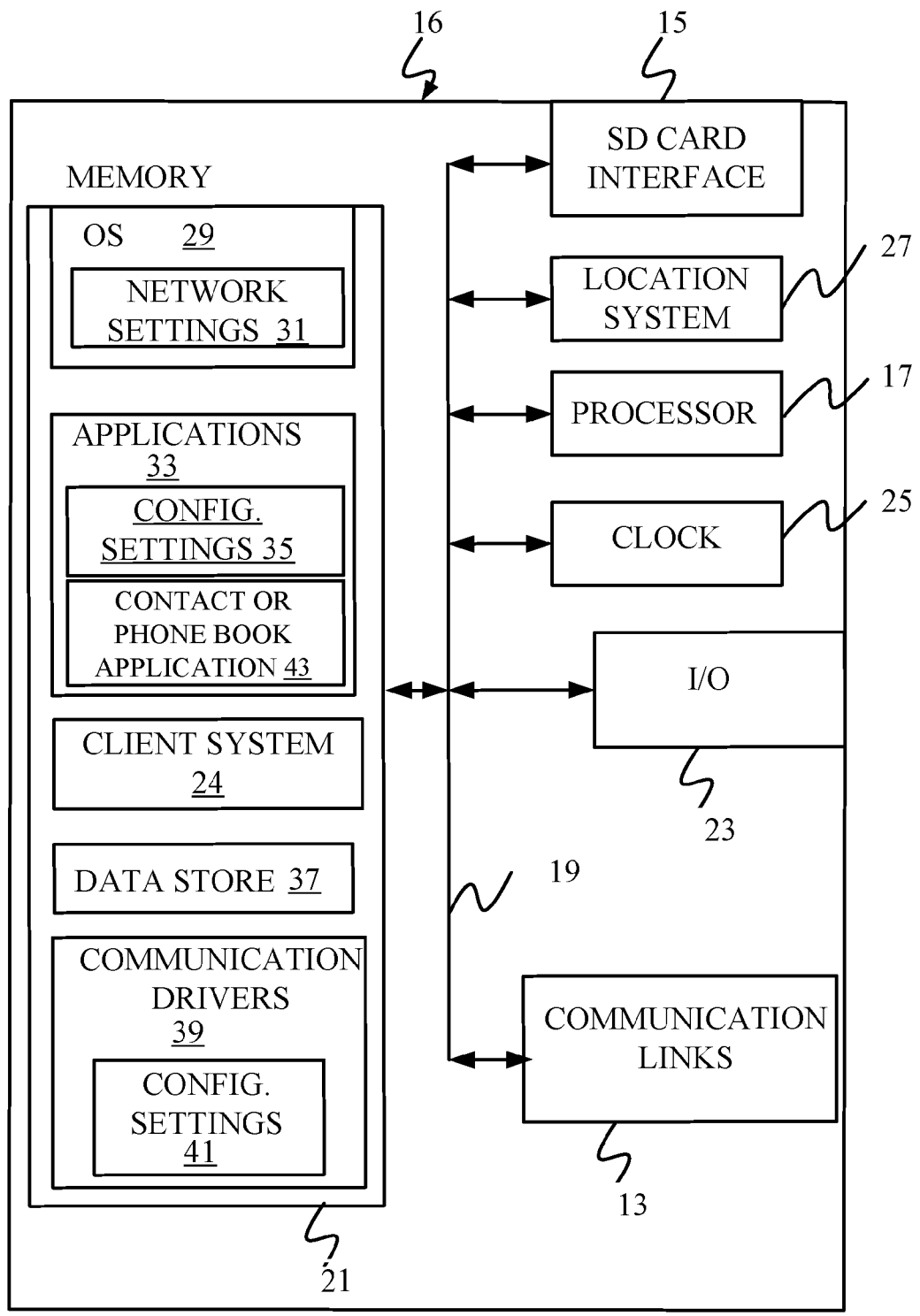
FIGS. 7-9 show examples of mobile devices that can be used in the architectures illustrated in the previous figures.
Figure 8:
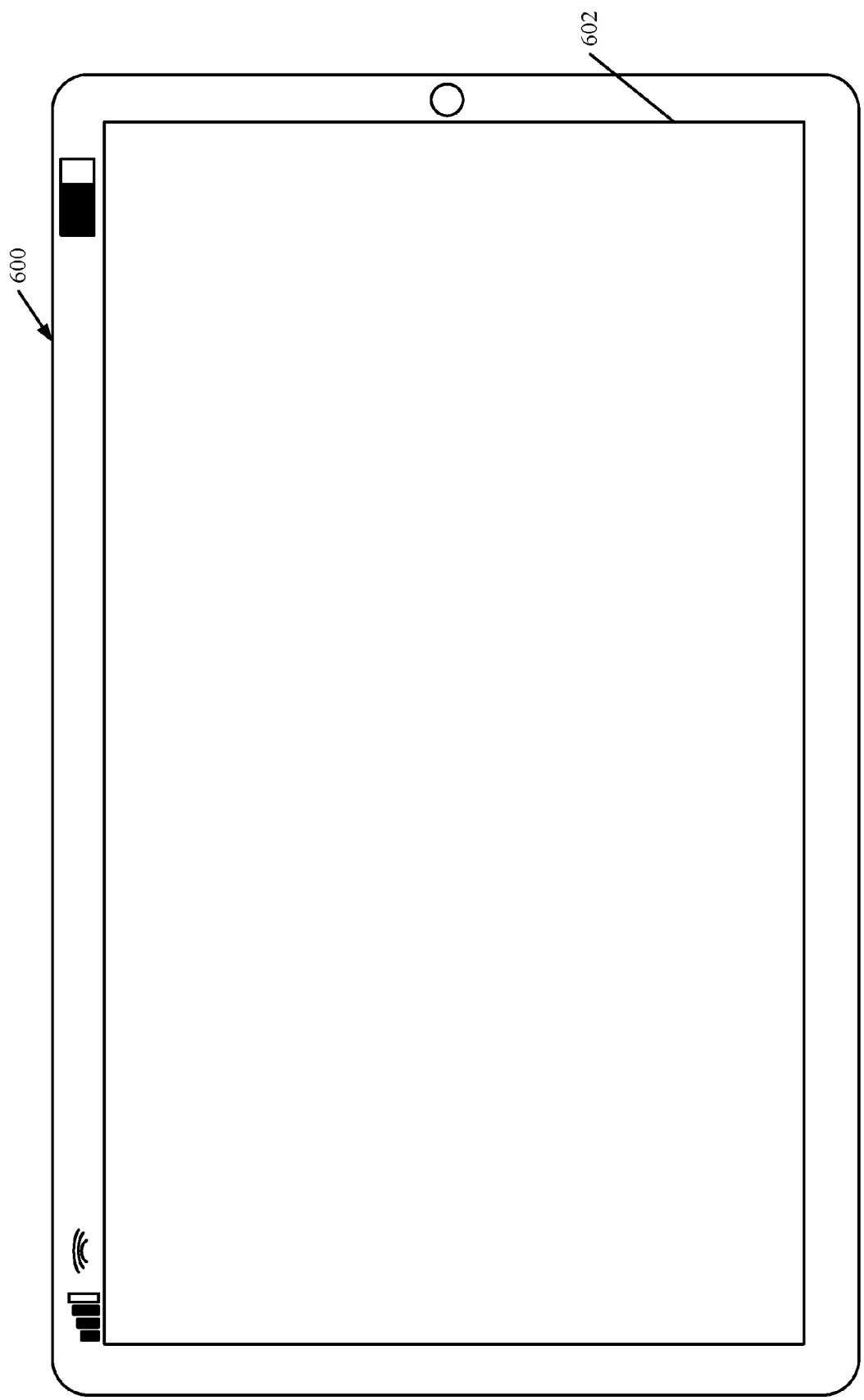
Figure 9:
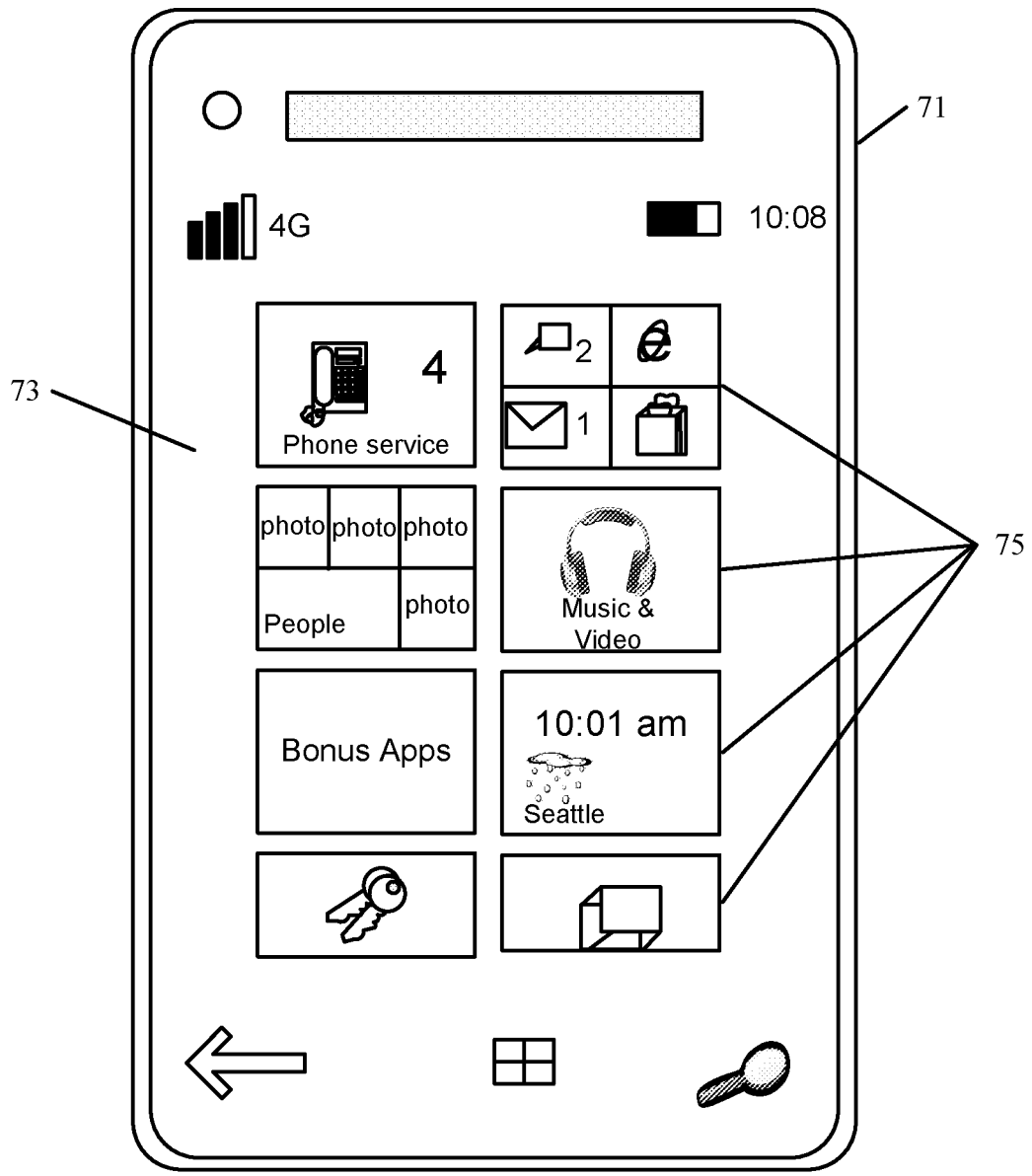

FIG. 7 is a simplified block diagram of one illustrative example of a handheld or mobile computing device that can be used as a user's or client's hand held device 16, in which the present system (or parts of it) can be deployed. FIGS. 8-9 are examples of handheld or mobile devices.

FIG. 7 provides a general block diagram of the components of a client device 16 that can run components of computer systems 102 and/or 104 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors 150, 122 or 124, from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 154 or the items in data store 156, for example, can reside in memory 21. Similarly, device 16 can have a client system 24 which can run various business applications or embody parts or all of the systems 102, 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one embodiment in which device 16 is a tablet computer 600. In FIG. 8, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
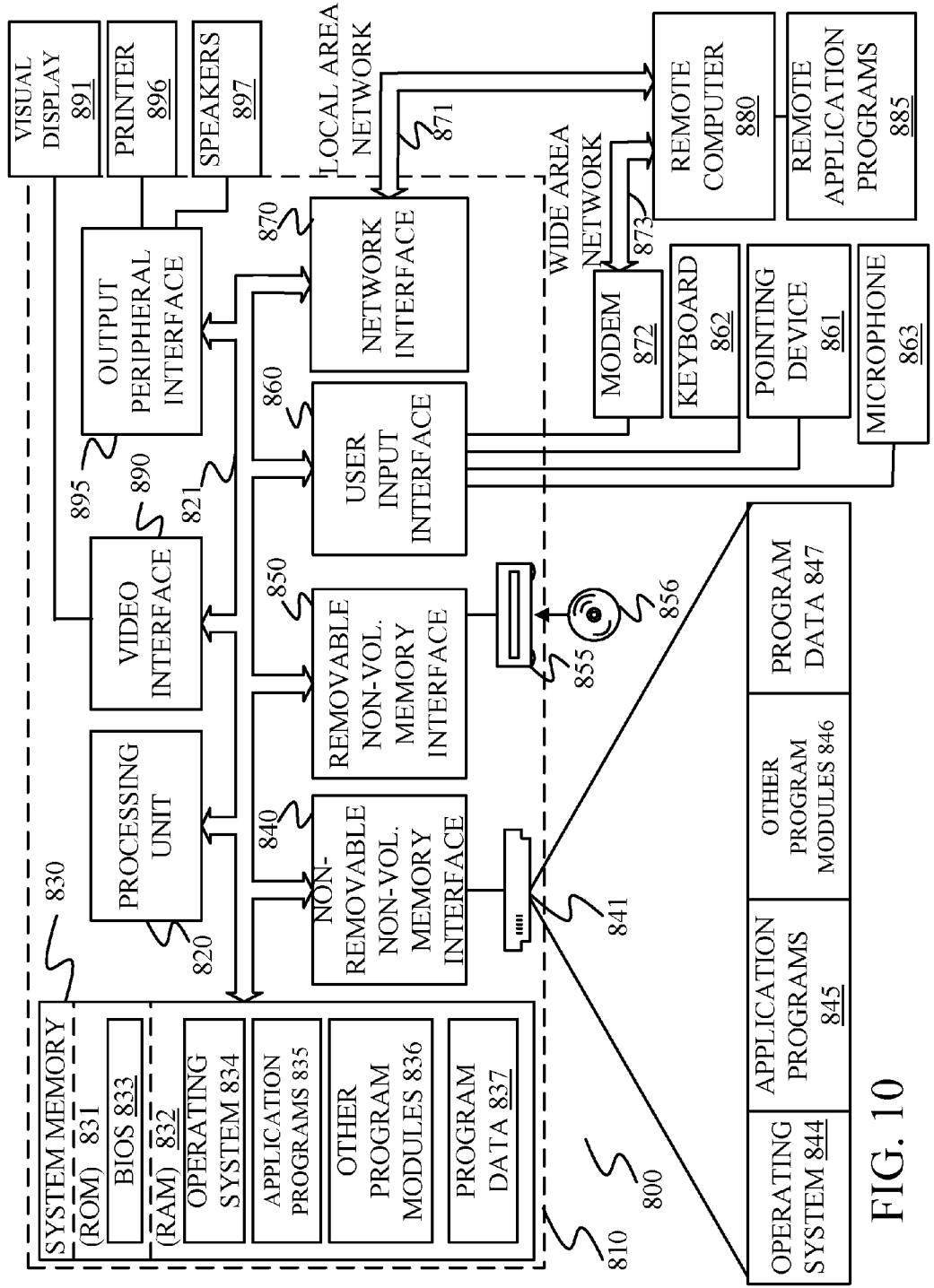
FIG. 10 is a block diagram of one example of a computing environment that can be used in the architectures shown in the previous figures.

FIG. 10 is one example of a computing environment in which architecture 100, or parts of it, (for example) can be deployed. With reference to FIG. 10, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

an application dependency identification system that applies filter criteria to data access request log data to identify dependencies of separate, requesting applications on an endpoint of a hosted application;

an application identifier control system that identifies a front end server system hosting the endpoint of the hosted application and remotely runs the application dependency identification system in the identified front end server system to identify the dependencies of the separate, requesting applications on the endpoint; and a result surfacing control system that generates a control signal to control surfacing of the dependencies of the separate, requesting applications on the endpoint.

Example 2 is the computing system of any or all previous examples wherein the application dependency identification system comprises:

request result identifying logic configured to access an application accessing log corresponding to the identified front end server system, that stores the data access request log data, and to apply a filter criterion to identify successful data access requests logged in the application accessing log.

Example 3 is the computing system of any or all previous examples wherein the application dependency identification system comprises:

URI pattern matching logic configured to access the application accessing log and apply filter criteria to identify data access requests that request data from the endpoint of the hosted application.

Example 4 is the computing system of any or all previous examples wherein the application dependency identification system comprises:

requesting client filtering logic configured to access server configuration information indicative of applications local to a computing environment in which the hosted application is hosted and to access the application accessing log and apply filter criteria to identify data access requests that come from the separate, requesting applications that are external to the computing environment in which the hosted application is hosted.

Example 5 is the computing system of any or all previous examples wherein the application identifier control system comprises:

server location logic configured to identify the front end server system hosting the endpoint of the hosted application.

Example 6 is the computing system of any or all previous examples wherein the server location logic is configured to identify a plurality of front end server systems hosting the endpoint of the hosted application.

Example 7 is the computing system of any or all previous examples wherein the application identifier control system comprises:

remote access logic configured to remotely access each of the plurality of front end server systems and remotely run the application dependency identification system on log data in application accessing logs corresponding to each of the front end server systems to separately identify, in each of the front end server systems, the dependencies of the separate, requesting applications on the endpoint.

Example 8 is the computing system of any or all previous examples wherein the application identifier control system comprises:

result transmission logic configured to transmit the separately identified dependencies from each of the plurality of front end server systems to the application identifier control system.

Example 9 is the computing system of any or all previous examples wherein the application identifier control system comprises:

result aggregation logic configured to aggregate the separately identified dependencies from each of the front end server systems into a single set of dependencies.

Example 10 is a computer implemented method, comprising:

identifying a front end server system hosting an endpoint of a hosted application;

remotely running a filter on data access request log data in the identified front end server system, with a set of filter criteria, to obtain filtered log data;

identifying application dependencies of separate, requesting applications on the endpoint of the hosted application based on the filtered log data; and generating a control signal to control surfacing of the application dependencies of the separate, requesting applications on the endpoint.

Example 11 is the computer implemented method of any or all previous examples wherein remotely running a filter comprises:

accessing an application accessing log corresponding to the identified front end server system, that stores the data access request log data; and applying a filter criterion to identify successful data access requests logged in the application accessing log.

Example 12 is the computer implemented method of any or all previous examples wherein remotely running a filter comprises:

accessing the application accessing log; and applying a filter criterion to identify data access requests that request data from the endpoint of the hosted application.

Example 13 is the computer implemented method of any or all previous examples remotely running a filter comprises:

accessing server configuration information indicative of applications local to a computing environment in which the hosted application is hosted;

accessing the application accessing log; and applying a filter criterion to identify data access requests that come from the separate, requesting applications that are external to the computing environment in which the hosted application is hosted.

Example 14 is the computer implemented method of any or all previous examples wherein identifying a front end server system comprises:

identifying a plurality of different front end server systems hosting the endpoint of the hosted application.

Example 15 is the computer implemented method of any or all previous examples wherein remotely running the filter comprises:

remotely accessing each of the plurality of different front end server systems; and remotely running the filter on log data in application accessing logs corresponding to each of the plurality of different front end server systems, and wherein identifying application dependencies comprises separately identifying, in each of the plurality of different front end server systems, the application dependencies of the separate, requesting applications on the endpoint.

Example 16 is the computer implemented method of any or all previous examples and further comprising:

transmitting the separately identified application dependencies from each of the plurality of different front end server systems to a separate application identifier control system.

Example 17 is the computer implemented method of any or all previous examples and further comprising:

aggregating the separately identified application dependencies from each of the plurality of different front end server systems into a single set of application dependencies.

Example 18 is a computing system, comprising:

an application identifier control system that identifies a front end server system hosting an endpoint of a hosted application;

an application dependency identification system comprising:

request result identifying logic configured to access an application accessing log, corresponding to the identified front end server system, that stores data access request log data, and to apply a filter criterion to identify successful data access requests logged in the application accessing log;

URI pattern matching logic configured to access the application accessing log and apply filter criteria to identify data access requests that request data from the endpoint of the hosted application; and requesting client filtering logic configured to access server configuration information indicative of applications local to a computing environment in which the hosted application is hosted and to access the application accessing log and apply filter criteria to identify data access requests that come from separate, requesting applications that are external to the computing environment in which the hosted application is hosted, the application identifier control system being configured to remotely run the application dependency identification system in the identified front end server system to identify application dependencies of the separate, requesting applications on the endpoint; and a result surfacing control system that generates a control signal to control surfacing of the application dependencies of the separate, requesting applications on the endpoint.

Example 19 is the computing system of any or all previous examples wherein the application identifier control system comprises:

server location logic configured to identify the front end server system hosting the endpoint of the hosted application wherein the server location logic is configured to identify a plurality of front end server systems hosting the endpoint of the hosted application.

Example 20 is the computing system of any or all previous examples wherein the application identifier control system comprises:

remote access logic configured to remotely access each of the plurality of front end server systems and remotely run the application dependency identification system on log data in application accessing logs corresponding to each of the plurality of front end server systems to separately identify, in each of the plurality of front end server systems, the dependencies of the separate, requesting applications on the endpoint;

result transmission logic configured to transmit the separately identified dependencies from each of the plurality of front end server systems to the application identifier control system; and result aggregation logic configured to aggregate the separately identified dependencies from each of the front end server systems into a single set of dependencies.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
an application dependency identification system configured to access server configuration information indicative of applications local to a computing environment in which a hosted application is hosted; and
an application identifier control system configured to:
identify a front end server system hosting an endpoint of the hosted application; and
remotely run the application dependency identification system in the identified front end server system to:
access an application accessing log corresponding to the identified front end server system, that stores data access request log data;
apply a filter criterion to identify data access requests, logged in the application accessing log, that come from separate, requesting applications that are external to the computing environment in which the hosted application is hosted and request data from the endpoint of the hosted application; and
identify dependencies of the separate, requesting applications on the endpoint; and
a result surfacing control system configured to generate a control signal to control surfacing of the dependencies of the separate, requesting applications on the endpoint.

2. The computing system of claim 1 wherein the application identifier control system comprises:
server location logic configured to identify the front end server system hosting the endpoint of the hosted application.

3. The computing system of claim 2 wherein the server location logic is configured to identify a plurality of front end server systems hosting the endpoint of the hosted application.

4. The computing system of claim 3 wherein the application identifier control system comprises:
remote access logic configured to remotely access each of the plurality of front end server systems and remotely run the application dependency identification system on log data in application accessing logs corresponding to each of the front end server systems to separately identify, in each of the front end server systems, the dependencies of the separate, requesting applications on the endpoint.

5. The computing system of claim 4 wherein the application identifier control system comprises:
result transmission logic configured to transmit the separately identified dependencies from each of the plurality of front end server systems to the application identifier control system.

6. The computing system of claim 5 wherein the application identifier control system comprises:
result aggregation logic configured to aggregate the separately identified dependencies from each of the front end server systems into a single set of dependencies.

7. A computer implemented method, comprising:
accessing server configuration information indicative of applications local to a computing environment in which a hosted application is hosted;
identifying a front end server system hosting an endpoint of the hosted application;
remotely running a filter on data access request log data in the identified front end server system, to obtain filtered log data, wherein remotely running the filter comprises:
accessing an application accessing log corresponding to the identified front end server system, that stores the data access request log data;
applying a filter criterion to identify data access requests, logged in the application accessing log, that come from the separate, requesting applications that are external to the computing environment in which the hosted application is hosted and request data from the endpoint of the hosted application;
identifying application dependencies of separate, requesting applications on the endpoint of the hosted application based on the filtered log data; and generating a control signal to control surfacing of the application dependencies of the separate, requesting applications on the endpoint.

8. The computer implemented method of claim 7 wherein identifying a front end server system comprises:
identifying a plurality of different front end server systems hosting the endpoint of the hosted application.

9. The computer implemented method of claim 8 wherein remotely running the filter comprises:
remotely accessing each of the plurality of different front end server systems; and
remotely running the filter on log data in application accessing logs corresponding to each of the plurality of different front end server systems, and wherein identifying application dependencies comprises separately identifying, in each of the plurality of different front end server systems, the application dependencies of the separate, requesting applications on the endpoint.

10. The computer implemented method of claim 9 and further comprising:
transmitting the separately identified application dependencies from each of the plurality of different front end server systems to a separate application identifier control system.

11. The computer implemented method of claim 10 further comprising:
aggregating the separately identified application dependencies from each of the plurality of different front end server systems into a single set of application dependencies.

12. A computing system, comprising:
an application identifier control system that identifies a front end server system hosting an endpoint of a hosted application;
an application dependency identification system comprising:
request result identifying logic configured to access an application accessing log, corresponding to the identified front end server system, that stores data access request log data, and to apply a filter criterion to identify successful data access requests logged in the application accessing log;
URI pattern matching logic configured to access the application accessing log and apply filter criteria to identify data access requests that request data from the endpoint of the hosted application; and
requesting client filtering logic configured to access server configuration information indicative of applications local to a computing environment in which the hosted application is hosted and to access the application accessing log and apply filter criteria to identify data access requests that come from separate, requesting applications that are external to the computing environment in which the hosted application is hosted, the application identifier control system being configured to remotely run the application dependency identification system in the identified front end server system to identify application dependencies of the separate, requesting applications on the endpoint; and
a result surfacing control system that generates a control signal to control surfacing of the application dependencies of the separate, requesting applications on the endpoint.

13. The computing system of claim 12 wherein the application identifier control system comprises:
server location logic configured to identify the front end server system hosting the endpoint of the hosted application wherein the server location logic is configured to identify a plurality of front end server systems hosting the endpoint of the hosted application.

14. The computing system of claim 13 wherein the application identifier control system comprises:
remote access logic configured to remotely access each of the plurality of front end server systems and remotely run the application dependency identification system on log data in application accessing logs corresponding to each of the plurality of front end server systems to separately identify, in each of the plurality of front end server systems, the dependencies of the separate, requesting applications on the endpoint;
result transmission logic configured to transmit the separately identified dependencies from each of the plurality of front end server systems to the application identifier control system; and
result aggregation logic configured to aggregate the separately identified dependencies from each of the front end server systems into a single set of dependencies.

* * * * *